April 28, 1953 L. R. STOKER 2,636,627
TRASH CAN HANDLING DEVICE
Filed Sept. 2, 1950 3 Sheets-Sheet 1

INVENTOR
Lewis R. Stoker
BY
Synnestvedt & Lechner
ATTORNEYS

April 28, 1953 L. R. STOKER 2,636,627
TRASH CAN HANDLING DEVICE
Filed Sept. 2, 1950 3 Sheets-Sheet 2

INVENTOR
Lewis R. Stoker
BY
Synnestvedt & Lechner
ATTORNEYS

April 28, 1953 L. R. STOKER 2,636,627
TRASH CAN HANDLING DEVICE
Filed Sept. 2, 1950 3 Sheets-Sheet 3
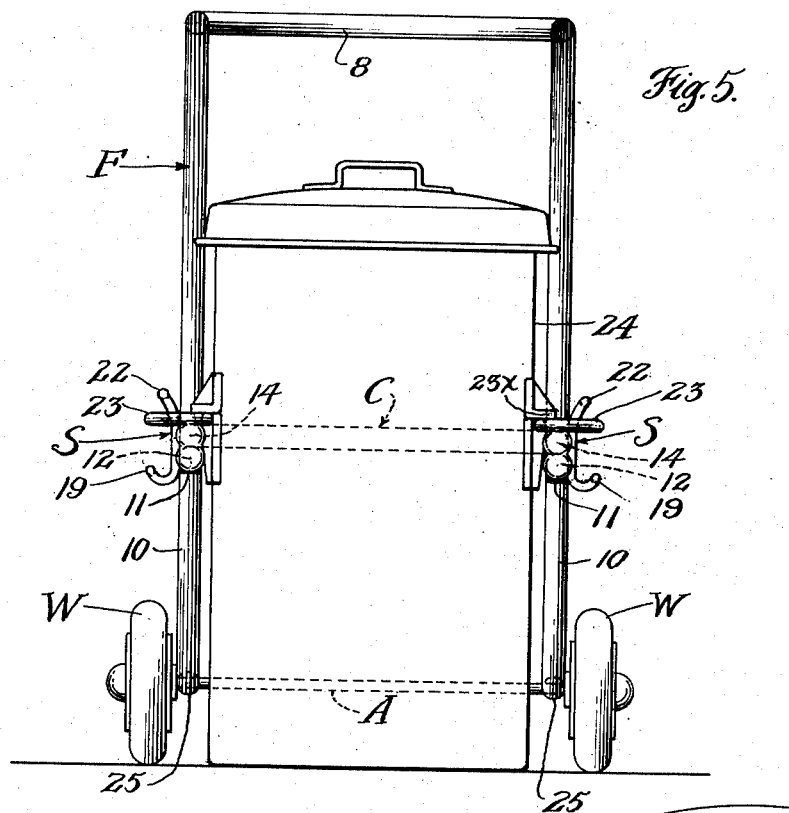
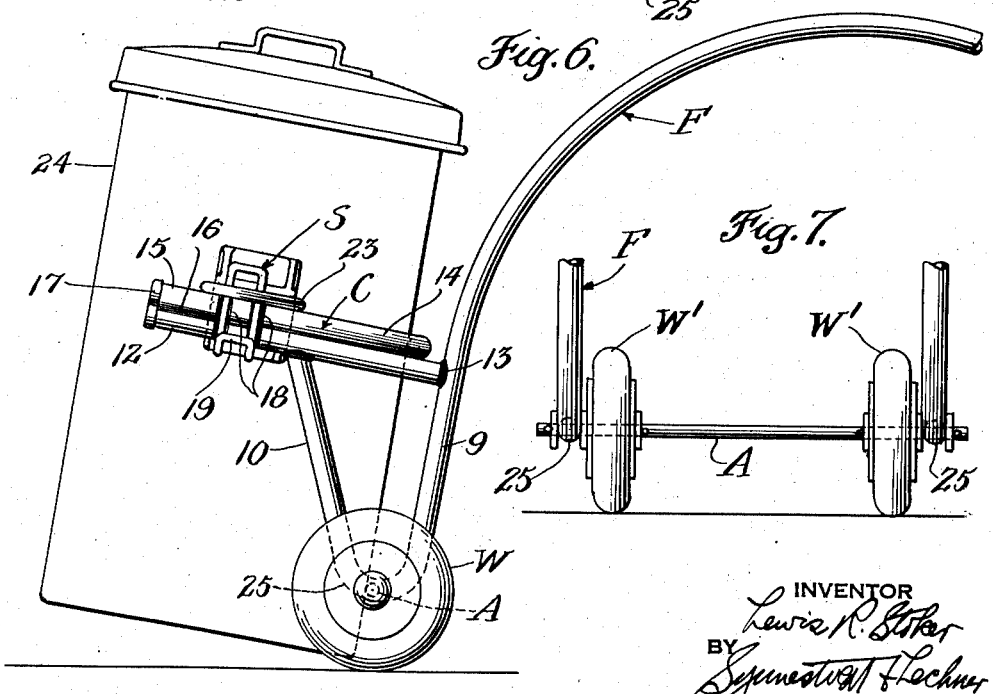
INVENTOR
Lewis R. Stoker
BY
ATTORNEYS Patented Apr. 28, 1953

2,636,627

UNITED STATES PATENT OFFICE 2,636,627

TRASH CAN HANDLING TRUCK

Lewis R. Stoker, Philadelphia, Pa.

Application September 2, 1950, Serial No. 183,011

9 Claims. (Cl. 214—384)

My invention relates to carts or trucks for handling trash cans or the like and is particularly useful for handling trash cans equipped with lifting handles.

The primary object of my invention is the provision of an improved trash can handling cart adapted to lift a can from a position of rest on the ground or floor to a suspended position for transporting it to a desired point, with a minimum of effort and without having to first lift the can up and then position it on the cart.

Another object of my invention is the provision of a trash can handling cart adapted to handle cans of different sizes without adding any accessories thereto and without adjusting any parts, and preferably adapted to handle standard cans of different regulation shapes and sizes.

A further object of my invention is the provision of a cart of the character described in which the can is suspended from the cart by its handles.

A still further object of my invention is the provision in a cart of the character described of handle engaging members so arranged and constructed as to be conveniently engaged, for lift and transportation, either by the handles of standard trash cans, for example of the bushel size, or by the higher positioned handles of other standard cans, for example the 20 gallon size trash cans, when the cart is in a substantially upright position.

It is another object of my invention to provide a two wheeled trash can handling cart in which the weight is distributed for ease of transportation, and in which the axle acts as a limiting stop for the can when the cart is tilted to its position of transportation.

Still further, the invention contemplates the provision of a handling cart of the type referred to which is adapted not only for ready pushing or pulling upon the level or upon ramps, but also for handling up and down stairs; the design of such a cart for greatest lightness consistent with the necessary strength, so that the load to be handled is not greatly increased by the weight of the cart itself; and the design of the cart in such manner that it can be very easily formed of standard cheap materials such as metal tubing, put together by bolts or rivets or with braced or welded joints.

Other objects and advantages of my invention have to do with simplicity and compactness of construction, low cost of manufacture, and ease of storage.

How the foregoing objects and advantages, together with such others as are incident to my invention, may be secured will be evident to those skilled in the art, from the following description, taken together with the accompanying drawings, wherein:

Figure 5 is a front view showing a trash can of the 20 gallon size in place ready to be transported;

Figure 6 is a side elevational view of Figure 5 showing the cart tilted to its position of transportation; and Figure 7 is a fragmentary front view of a modified form of wheel arrangement.

Figure 1:
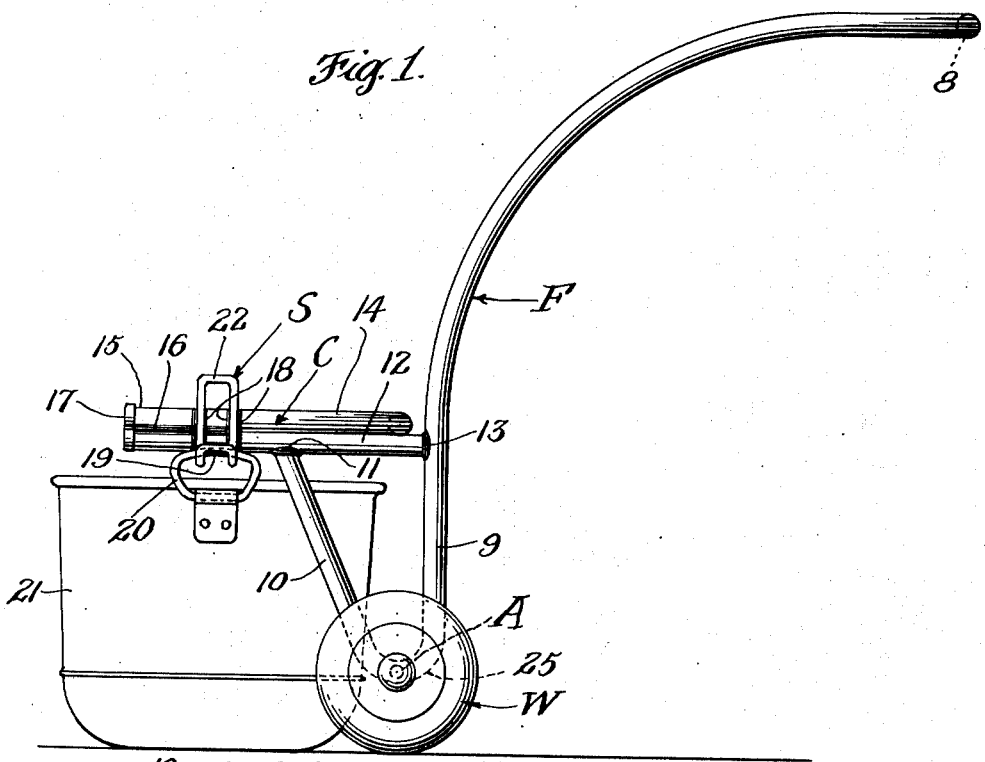
Figure 1 is a side elevational view of a cart constructed in accordance with my invention showing a trash can of the bushel size in place ready to be transported.

The device comprises in general a frame F, an axle A for the wheels W, cradle structure C, and suspension brackets S carried by the cradle structure C.

The frame F is so designed as to be readily constructed of metal tubing. It is substantially of U-shape in plan view as seen in Figure 2, with the bend of the U forming a handle 8. As viewed in the side view of Figure 1 the legs of the U-frame curve downwardly and forwardly from the handle 8 into upright portions 9, and then bend upwardly and forwardly as indicated at 10 so as to form upright U-shaped elements at each side, in planes generally at right angles to the first-mentioned U as it appears in plan. The upper ends of the portions 10 are secured as by means of welds 11 to tubular side arms 12 extending forwardly from the upright portions 9 of the frame. These side arms are welded to the portions 9 of the frame, as indicated at 13.

A substantially semi-circular or U-shaped tubular member 14, located horizontally, with the open end of the U forward, is secured, at its free end portions 15, on top of the side arms 12 as by means of welds indicated at 16 and this member 14, together with the side arms 12, constitute the cradle structure C above referred to. Closure caps 17 are provided at the open ends of the tubes 12 and 14.

Figure 2:
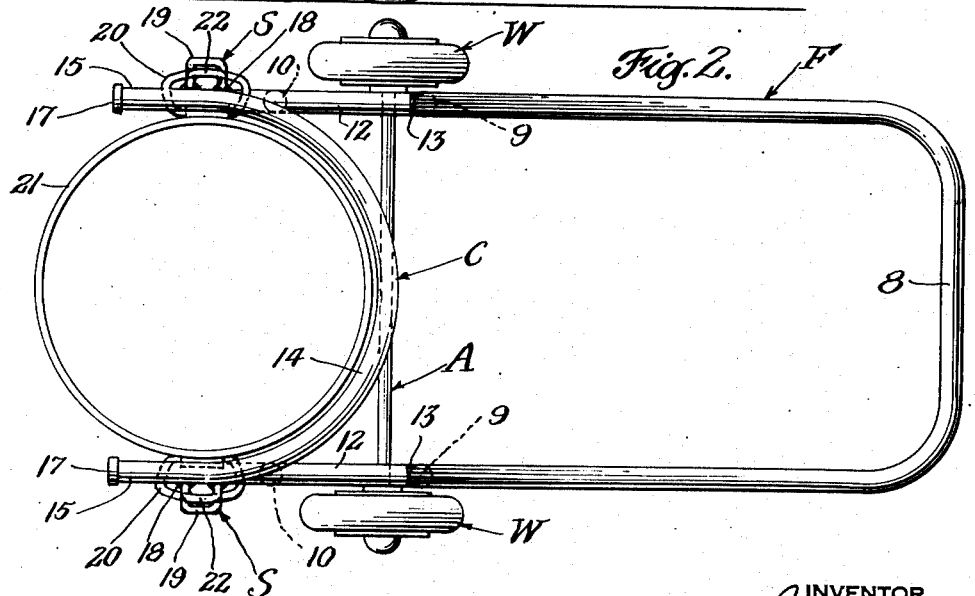
Figure 2 is a plan view of the construction of Figure 1.
Figure 3:
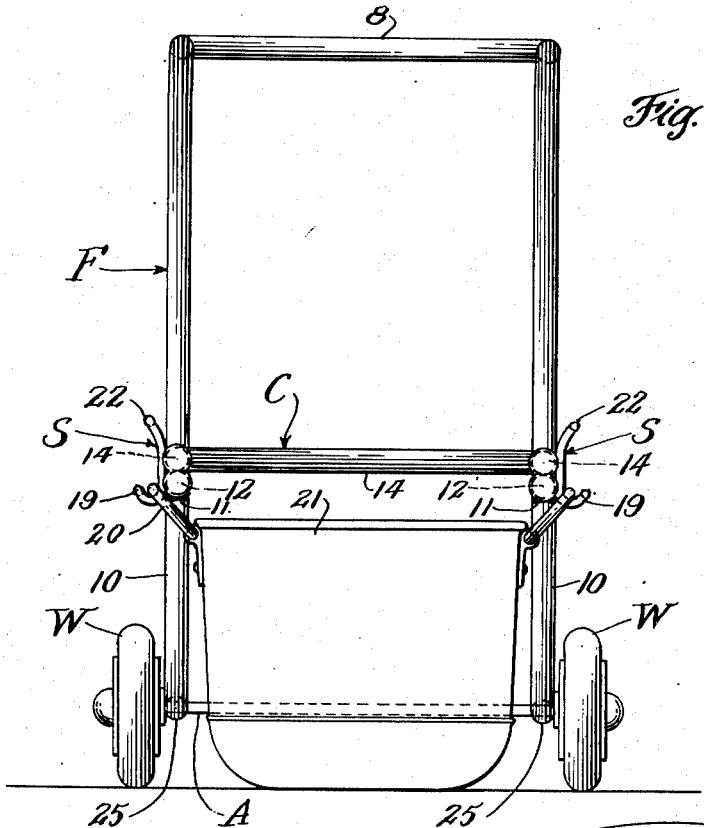
Figure 3 is a front view thereof.
Figure 4:
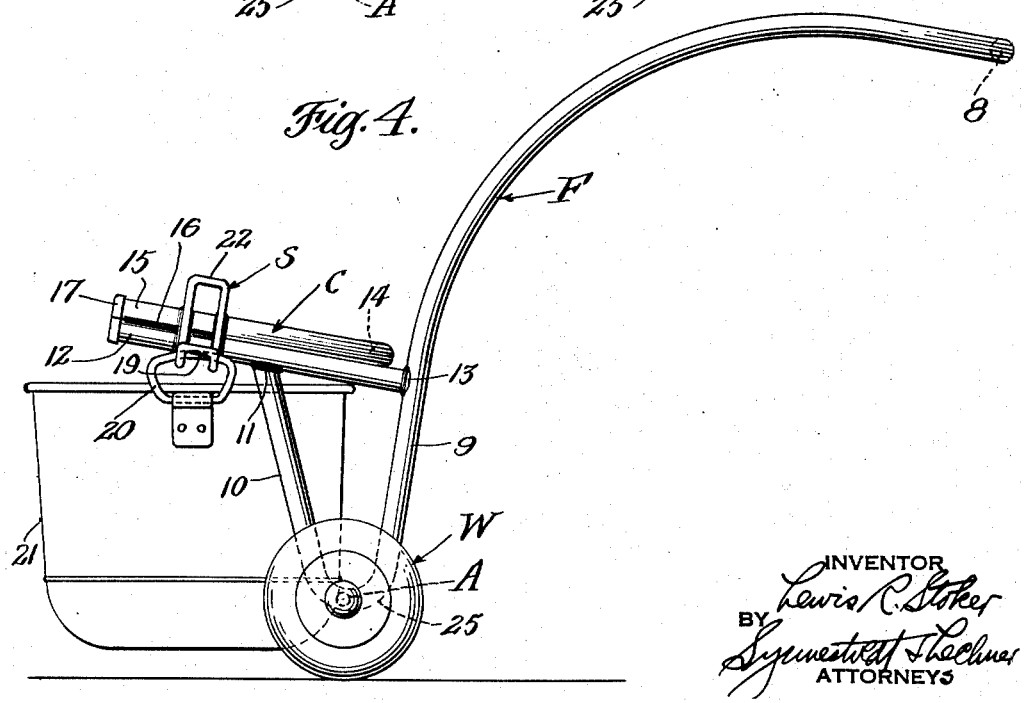
Figure 4 is a side elevational view similar to Figure 1 but showing the cart tilted to its position of transportation.

The suspension brackets S are preferably of closed loop form as shown in Figure 1, and are secured, as by means of welds 18, to the outer sides of the cradle structure C. The lower portions of these brackets are bent outwardly and upwardly to provide hooks 19 adapted to be engaged with the handles 20 of a standard trash can 21 of bushel size. The upper portions 22 of these brackets are bent outwardly, as best seen in Figure 3, and are adapted to be engaged by the higher handles 23 of a trash can 24 of larger size, such as the standard 20 gallon size of ash can, as will later be described with reference to Figures 5 and 6. In this connection it is to be observed that the cradle structure C is located at a height above the wheels such that the brackets S will be approximately at the level of the handles of a trash can resting on the floor when the cart is in a substantially upright position; the upper and lower portions of said brackets S being positioned at different heights for purposes which will later appear.

In the lower bends 25 of the frame F, holes are provided for the axle A of the wheels W which are preferably provided with rubber tires. It will be noted that in Figures 1 to 6 inclusive I have shown the wheels mounted outside of the frame and that in the modification illustrated in Figure 7 the wheels W' are mounted inside of the frame to reduce the overall width of the device. The diameter of the wheels and tires may be made such that the cart may readily be moved up and down a flight of stairs.

Reverting now to Figures 1 to 3 inclusive, it is pointed out that when using the cart of my invention for transporting trash cans of the type shown in Figures 1 to 4 inclusive, it is wheeled up to a can resting on the floor with the overhanging cradle structure C substantially centered above the can and then the cart is tilted slightly in a direction toward the can to lower the hooks 19 to a point to enable the handles 20 of the can to be swung upwardly over the hooks. Next the cart is tilted in a direction away from the can to cause the hooks to engage the handles as illustrated in Figure 1, and upon tilting the cart further, to the position illustrated in Figure 4, the can is raised from the floor into suspended position to enable its being readily wheeled along. It is to be noted that when the cart is tilted to the position just described, the lower portion of the can engages the axle A as a limiting stop, thereby transmitting part of the load directly to the axle.

When the cart is used for transporting large trash cans, such as shown in Figures 5 and 6, it is wheeled into position so that the can lies within the semi-circular cradle structure C, and then the cart is tilted forwardly to lower the brackets S, then the handles 23 are lifted to horizontal position, and then the cart is tilted rearwardly to lift the can off the floor, as shown in Figure 6. When the cart is so tilted the can engages the axle A at its lower portion, and the semi-circular member 14 at its intermediate portion. Thus the can is well cradled in the cart and may be readily transported along. It will be seen from Figures 5 and 6 that the can 24 is of the type which has handles 23 mounted on brackets provided with stops 23x so that the handles 23 will not swing above a horizontal position. With this known construction, when the cart is tilted to the position shown in Figure 6, the weight imposed through the handles 23 is not carried on the lifting brackets S (as it is in the case of the can 21 in Figures 1 to 4) but bears directly on the cradle member 14. Neverthe- less, the brackets S still serve the function of positioning the can and preventing it from slipping off the cradle. With still another form standard "pull" can, where the handles 23 are not associated with stop members 23x, they will normally swing upward until the outer portion of the handles engages the brackets S near their upper ends 22 (as the weight of the can comes down upon the members 14) and in such case the outwardly curved portions 22 of the brackets S keep the handles from swinging all the way up and allowing the can to slip down out of the cradle.

Additionally, lots of different shapes having other kinds of handles, lips, rims, or various kinds of supports, may be carried by engaging said supports at the inner or outer sides of the upper ends of the brackets S, or by means of the hook-like lower portions 19 thereof.

It will be seen from the foregoing that since my improved cart is constructed to carry the weight low, and in the region of the wheels, a minimum of effort is required to lift and transport a substantial load. Also by locating the suspension brackets at a height to engage the handles of a can, when resting on the floor, the can is lifted from the floor onto the truck by merely tilting the truck to transporting position, thus eliminating the usual step of lifting the can from the ground level up and onto a wheelbarrow or similar conveyance; and by making the suspension brackets of the particular vertical elongated configuration shown, with means at the lower end for carrying a can and with means at the upper end for positioning or carrying (or cooperating with the members 14 in so doing), it is feasible to operate the cart in almost identical fashion whether the cans be of any of several standard styles and/or sizes.

By locating the supporting structure for the can forwardly of the wheels the cart can be readily pulled up-stairs even though heavily loaded.

The compactness of the cart enables it to be wheeled in close quarters or through narrow places and enables it to be stored in a small space, and since it is of simple and light construction it can be easily hung up for storage.

While I have described my invention as used for typical ash cans of the bushel and 20 gallon size, it may obviously be designed for use with other standard containers or for use with containers of special size and/or construction for special purposes.

Without further description it will be apparent how the objects and advantages first set forth herein are realized; and to those skilled in the art of manufacture of carts and those skilled in the use of container-handling equipment, many other advantages and possible modifications of the invention within the intended scope of the claims will readily come to mind.

I claim:

1. A cart for handling and transporting trash cans and the like having carrying handles, comprising a frame having an upper handle portion, a lower axle and wheel supporting portion, and an intermediate can supporting portion having fixed brackets engageable with the handles of a can to be transported, said brackets having lower hooked portions for receiving the handles of a can of one height to support it and having upper portions for receiving the handles of a can of greater height to support it.

2. A cart for handling and transporting trash cans and the like having carrying handles, comprising a frame having an upper handle portion, a lower axle-carrying portion, an intermediate open-fronted cradle portion for supporting a can for transportation and configured and disposed to be slipped directly forwardly into embracing relation with the sides of a tall can having greater height than said cradle portion, and bracket members carried by and located at the sides of said cradle portion and engageable with the handles of the can, and an axle and wheels mounted in said axle carrying portion of the frame.

3. The construction of claim 2 wherein said open-fronted cradle portion is disposed at a height such that when level it clears the top of the standard bushel can when the latter is resting on the ground.

4. The construction of claim 2 wherein said handle portion comprises a generally inverted U-shaped member, the two lower ends of which are in turn bent to form each a U element in a plane approximately at right angles to the U first mentioned, and said cradle portion comprises a second U-shaped member secured to the two lower U elements in a generally horizontal position, with the open part of the latter U-shaped member having its maximum diameter disposed to form the open front of said cradle portion.

5. A cart for handling and transporting trash cans and the like having carrying handles, comprising a frame having an upper handle portion, a lower axle and wheel supporting portion, and an intermediate can supporting cradle having bracket means engageable with the handles of a can to be transported, said bracket means extending below said cradle to engage the handles of a can of one height, and said bracket means extending above said cradle to engage the handles of a can of greater height.

6. A cart for handling and transporting trash cans and the like having carrying handles, comprising a frame having an upper handle portion, a lower axle and wheel supporting portion, and an intermediate can supporting portion having brackets engageable with the handles of a can to be transported, said intermediate portion being located at such height above the axle and wheels that said brackets will engage the handles of a can resting on the floor when the cart is in substantially upright position and will raise the can into suspended position above the floor when the cart is tilted to transporting position, said axle being positioned to lie approximately beneath the rear of the said intermediate portion when the cart is in said upright position, so that when the cart is so tilted the can will engage the axle as a limiting stop.

7. A cart for handling and transporting trash cans and the like having carrying handles, comprising a frame having an upper handle portion, a lower axle and wheel supporting portion, and an intermediate substantially semi-circular cradle portion having brackets engageable with the handles of a can to be transported, said cradle portion being located at such height above the axle and wheels that said brackets will engage the handles of a can resting on the floor when the cart is in substantially upright position and will raise the can into suspended position clear of the floor when the cart is tilted to transporting position, said axle being positioned to lie approximately beneath the rear of the said intermediate portion when the cart is in said upright position, so that when the cart is so tilted the lower end of the can will engage the axle and its mid-part will engage the cradle portion.

8. A cart for handling and transporting trash cans and the like having carrying handles, comprising a substantially U-shaped tubular frame forming a handle at the bend of the U and having its legs bent to extend forwardly and downwardly from said handle to form side members, said side members being bent upwardly and forwardly at their lower end portions to form angular side braces, an axle and wheels carried by said side members at said lower bends, forwardly extending side arms secured to said angular side braces, a substantially semi-circular tubular member secured on top of said side arms adjacent the forward ends thereof, said semi-circular member being positioned on said arms with its open end forward, and brackets secured to said side arms in position to engage the handles of the trash can.

9. A cart for handling and transporting trash cans and the like having carrying handles, comprising a frame having an upper handle portion, a lower axle and wheel supporting portion, and an intermediate can supporting cradle having brackets engageable with the handles of a can to be transported, said brackets extending below said cradle to engage the handles of a can of one height, and extending above said cradle to engage the handles of a can of greater height, the lower extension of each bracket being bent outwardly and upwardly to carry a handle in suspension, and the upper extension of each bracket being bent outwardly to prevent dislodgement of an upwardly angled handle in engagement therewith.

LEWIS R. STOKER.

References Cited in the file of this patent

UNITED STATES PATENTS

| Number | Name | Date |
| --- | --- | --- |
| 780,777 | Colling | Jan. 24, 1905 |
| 2,504,907 | Truran | Apr. 18, 1950 |

FOREIGN PATENTS

| Number | Country | Date |
| --- | --- | --- |
| 49,360 | Germany | Nov. 5, 1889 |
| 314,286 | Italy | Jan. 22, 1934 |